United States Patent
Cho et al.

(10) Patent No.: US 9,838,674 B2
(45) Date of Patent: Dec. 5, 2017

(54) MULTI-VIEW AUTOSTEREOSCOPIC DISPLAY AND METHOD FOR CONTROLLING OPTIMAL VIEWING DISTANCE THEREOF

(71) Applicant: LG DISPLAY CO., LTD., Seoul (KR)

(72) Inventors: Seongho Cho, Paju-si (KR); Keongjin Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 642 days.

(21) Appl. No.: 14/109,655

(22) Filed: Dec. 17, 2013

(65) Prior Publication Data
US 2014/0168390 A1 Jun. 19, 2014

(30) Foreign Application Priority Data
Dec. 18, 2012 (KR) .................. 10-2012-0148695

(51) Int. Cl.
H04N 13/04 (2006.01)
H04N 9/47 (2006.01)

(52) U.S. Cl.
CPC ....... *H04N 13/0404* (2013.01); *H04N 13/042* (2013.01); *H04N 13/0415* (2013.01); *H04N 13/0452* (2013.01); *H04N 13/0468* (2013.01)

(58) Field of Classification Search
CPC ........... H04N 13/0404; H04N 13/0415; H04N 13/042; H04N 13/0452; H04N 13/0468
USPC ................ 348/43, 51, 54, E13.026, E13.062
See application file for complete search history.

(56) References Cited

U.S. PATENT DOCUMENTS

| | | | |
|---|---|---|---|
| 2010/0073467 A1 | 3/2010 | Nam et al. | |
| 2011/0102423 A1 | 5/2011 | Nam et al. | |
| 2012/0019516 A1 | 1/2012 | Park et al. | |
| 2012/0032952 A1 | 2/2012 | Lee et al. | |
| 2013/0050417 A1* | 2/2013 | Wang | G02B 27/2214 348/43 |

FOREIGN PATENT DOCUMENTS

| | | |
|---|---|---|
| JP | 1-317091 A | 12/1989 |
| JP | 10-174127 A | 6/1998 |
| JP | 2010-72626 A | 4/2010 |
| JP | 2011-101366 A | 5/2011 |
| JP | 2012-203050 A | 10/2012 |
| JP | 5095851 B1 | 12/2012 |

* cited by examiner

*Primary Examiner* — Paulos M Natnael
*Assistant Examiner* — Omer Khalid
(74) *Attorney, Agent, or Firm* — Birch, Stewart, Kolasch & Birch, LLP

(57) ABSTRACT

A display including an optical element disposed on a pixel array of a display panel; an optimal viewing distance control device configured to adjust primary view images seen through both eyes of a viewer to a first view image and second view image based on a viewer's position information sensed by a sensor, to automatically adjust other view images between the primary view images to view images separated at regular intervals, and to produce a view map using the adjusted primary view images and the adjusted other view images between the primary view images; a 3D formatter configured to map pixel data of a multi-view image based on the view map received from the optimal viewing distance control device; and a display panel driving circuit configured to write the pixel data of the multi-view image received from the 3D formatter to the display panel.

12 Claims, 10 Drawing Sheets

MULTI-VIEW AUTOSTEREOSCOPIC DISPLAY AND METHOD FOR CONTROLLING OPTIMAL VIEWING DISTANCE THEREOF

This application claims the benefit of Korean Patent Application No. 10-2012-0148695 filed on Dec. 18, 2012, the entire contents of which is incorporated herein by reference for all purposes as if fully set forth herein.

BACKGROUND OF THE INVENTION

Field of the Invention

Embodiments of the invention relate to a multi-view autostereoscopic display and a method for controlling an optimal viewing distance thereof.

Discussion of the Related Art

As stereoscopic image reproduction technology is applied to display devices such as a television and a monitor, people can easily view three-dimensional (3D) stereoscopic images even at home. A 3D display may be classified into a stereoscopic display using glasses and an autostereoscopic display called a glasses-free 3D display. The stereoscopic display separates a left eye image and a right eye image using polarization glasses or liquid crystal shutter glasses, thereby implementing a stereoscopic image. Further, the autostereoscopic display installs an optical element, such as a parallax barrier or a lenticular lens (hereinafter abbreviated to "lens"), in front of or behind a display screen and separates optical axes of a left eye image and a right eye image, thereby implementing a stereoscopic image.

As shown in FIG. 1, the autostereoscopic display calculates an optimal viewing distance OVD, at which a viewer can properly view a stereoscopic image, based on a back length between a pixel array PIX of a display panel and a lens LENS, a focal length of the lens LENS, a pixel pitch Ppix, a lens pitch Plens, a distance between a left eye and a right eye of the viewer, etc. In FIG. 1, the back length, the focal length of the lens LENS, the pixel pitch Ppix, the lens pitch Plens, and the distance between the left and right eyes of the viewer are fixed to constant values. Further, the distance between the left and right eyes of the viewer is about 65 mm for average adults.

Thus, as shown in FIG. 1, the optimal viewing distance OVD of the autostereoscopic display is fixed to a specific position. When the adjustment of the optimal viewing distance OVD is required, the back length or the focal length of the lens LENS has to be changed. Even when the autostereoscopic display has a barrier instead of the lens LENS shown in FIG. 1, the optimal viewing distance OVD is fixed to a specific position.

In FIG. 1, "REZ" denotes a right eye viewing zone where pixels R (hereinafter, referred to as "right eye pixels"), to which a right eye image is formed, can be seen, and "LEZ" denotes a left eye viewing zone where pixels L (hereinafter, referred to as "left eye pixels"), to which a left eye image is formed, can be seen. "PSUBS" is a transparent substrate for securing the back length between the pixel array PIX and the lens LENS.

If the viewer moves forward or backward from the optimal viewing distance OVD, the viewer may see both the left eye pixels and the right eye pixels through his or her eye (right eye or left eye) and thus may experience 3D crosstalk. In addition, the autostereoscopic display can be implemented as a multi-view system. In the multi-view system, a multi-view image is formed to the pixel array PIX, thereby enabling the viewer to see a stereoscopic image at different positions from the optimal viewing distance OVD. In the multi-view system, if the viewer moves forward or backward from the optimal viewing distance OVD, view images seen through one eye of the viewer are overlapped, thus making the viewer feel the 3D crosstalk. Thus, only when the viewer sees the image at the optimal viewing distance OVD of the autostereoscopic display, the viewer may see the normal stereoscopic image.

One method for controlling the optimal viewing distance of the autostereoscopic display has been proposed to estimate a view image of the pixel array the viewer sees when the viewer moves out of the optimal viewing distance, and modify pixel data of the view image the viewer sees. In this method, examples of modifying the pixel data include a shifting method and a scaling method. The shifting method moves a view map from side to side when the viewer moves from side to side along an x-axis. The scaling method adjusts a ratio of the view map when the viewer goes close to or far from the display panel along a z-axis.

In addition, the x-axis is parallel to the screen of the display panel, and the z-axis is vertical to the screen of the display panel. However, the related art method for controlling the optimal viewing distance is done by applying the same algorithm to the display panel. Further, because the related art method for controlling the optimal viewing distance did not consider a refractive index of a lens of an optical element, the method is not accurate. A related art method for controlling the optimal viewing distance is disclosed in U.S. publication No. 2009/0123030 A1 (2009 May 14).

SUMMARY OF THE INVENTION

Accordingly, one aspect of the present invention is to address the above noted and other problems of the related art.

Another aspect of the present invention is to provide a multi-view autostereoscopic display and corresponding method for providing a stereoscopic feeling and enhanced image quality even when the viewer moves out of the optimal viewing distance.

To achieve these and other advantages and in accordance with the purpose of the present invention, as embodied and broadly described herein, the present invention provides in one aspect a display including an optical element disposed on a pixel array of a display panel; an optimal viewing distance control device configured to adjust primary view images seen through both eyes of a viewer to a first view image and second view image based on a viewer's position information sensed by a sensor, to automatically adjust other view images between the primary view images to view images separated at regular intervals, and to produce a view map using the adjusted primary view images and the adjusted other view images between the primary view images; a 3D formatter configured to map pixel data of a multi-view image based on the view map received from the optimal viewing distance control device; and a display panel driving circuit configured to write the pixel data of the multi-view image received from the 3D formatter to the display panel.

In another aspect, the present invention provides a method of controlling a display, the method includes an optical element disposed on a pixel array of a display panel; adjusting, via an optimal viewing distance control device of the display, primary view images seen through both eyes of a viewer to a first view image and second view image based on a viewer's position information sensed by a sensor;

automatically adjust, via the optimal viewing distance control device, other view images between the primary view images to view images separated at regular intervals; producing, via the optimal viewing distance control device, a view map using the adjusted primary view images and the adjusted other view images between the primary view images; mapping, via a 3D formatter of the display, pixel data of a multi-view image based on the view map received from the optimal viewing distance control device; and writing, via a display panel driving circuit of the display, the pixel data of the multi-view image received from the 3D formatter to the display panel.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

A multi-view autostereoscopic display according to an embodiment of the invention may be implemented based on a flat panel display such as a liquid crystal display (LCD), a field emission display (FED), a plasma display panel (PDP), an organic light emitting display, and an electrophoresis display (EPD). The multi-view autostereoscopic display according to the embodiment of the invention can display data of a two-dimensional (2D) image in a 2D mode and display data of a three-dimensional (3D) image in a 3D mode.

Further, a 3D optical element separates optical axes of multi-view images displayed on a display panel using a lens. The 3D optical element may be attached on a pixel array of the display panel. The 3D optical element may be implemented as a switchable lens for electrically controlling a lens using a liquid crystal display panel. The switchable lens is disclosed in U.S. patent application Ser. Nos. 13/077,565 and 13/325,272, and which are hereby incorporated by reference in their entirety.

Figure 1:
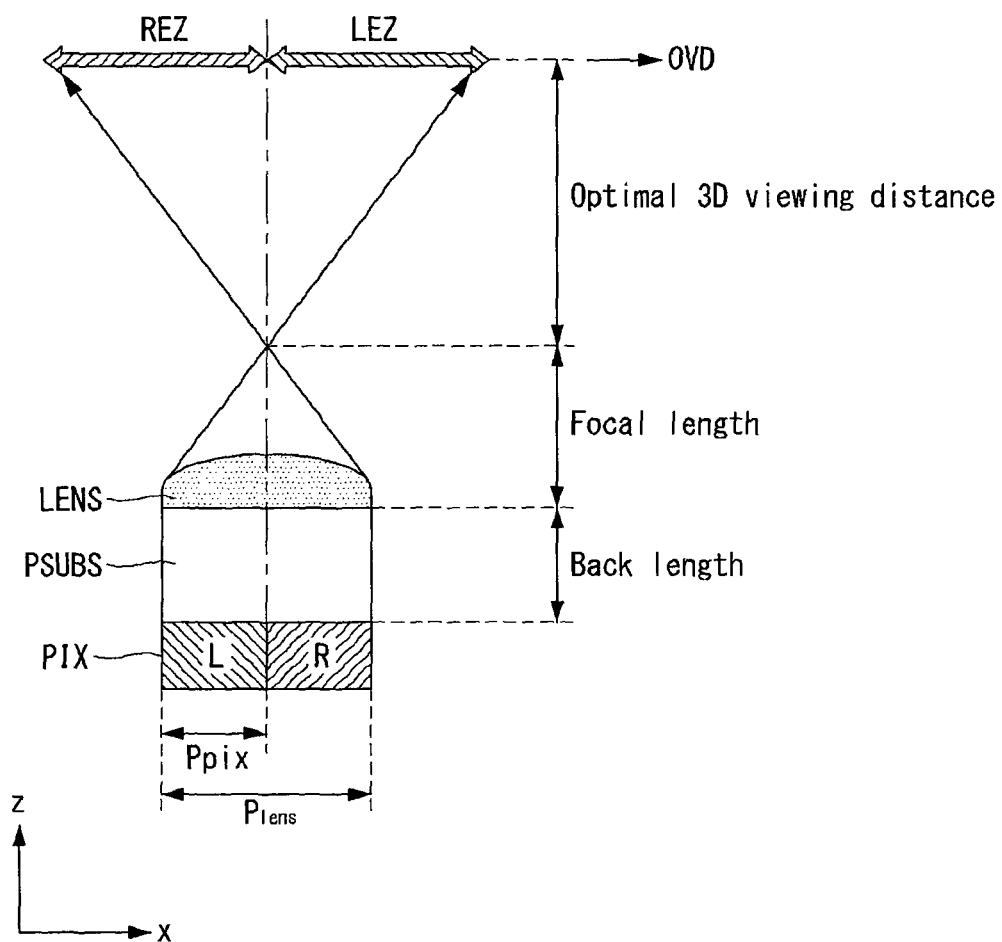
FIG. 1 illustrates an optimal viewing distance of a related art autostereoscopic display.
Figure 2:
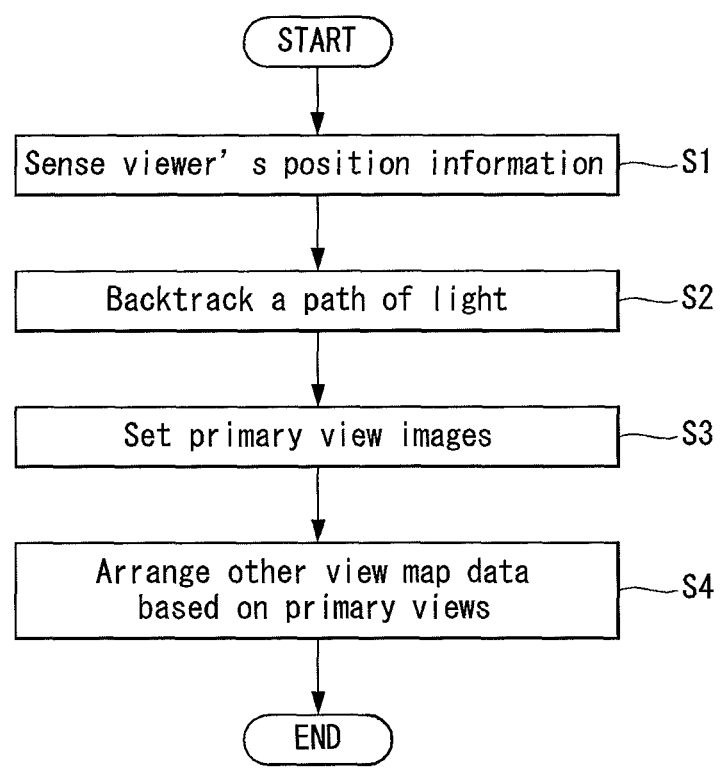
FIG. 2 is a flow chart illustrating a method for controlling an optimal viewing distance of a multi-view autostereoscopic display according to an embodiment of the invention.
Figure 3:
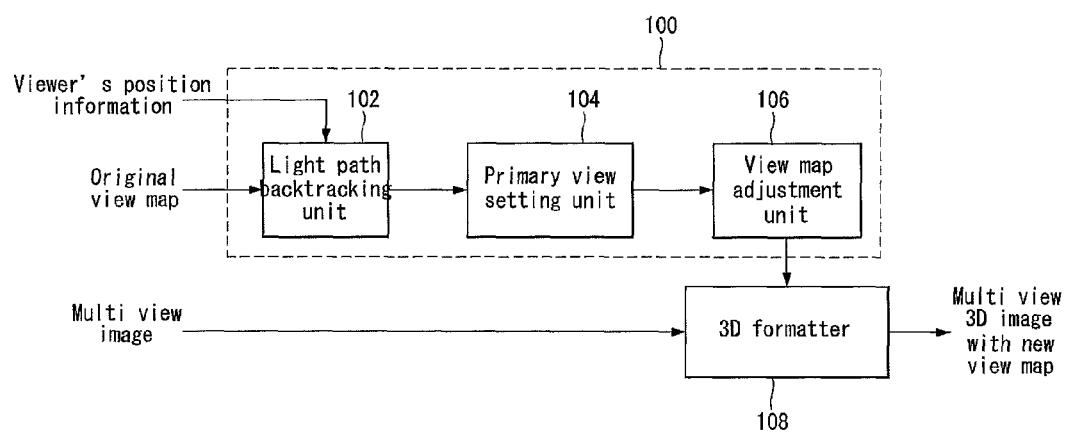
FIG. 3 is a block diagram of an optimal viewing distance control device of a multi-view autostereoscopic display according to an embodiment of the invention.

Next, FIG. 2 is a flow chart illustrating a method for controlling an optimal viewing distance of a multi-view autostereoscopic display and FIG. 3 is a block diagram of an optimal viewing distance control device of the multi-view autostereoscopic display according to an embodiment of the invention.

As shown in FIG. 2, an optimal viewing distance control device 100 includes a light path backtracking unit 102, a primary view adjusting unit 104, a view map adjustment unit 106, etc. The optimal viewing distance control device 100 adjusts primary view images seen through both eyes of a viewer to an Ith view image and an (I+1)th view image based on a viewer's position information, where I is a positive integer. For example, the optimal viewing distance control device 100 can adjusts the primary view images seen through both eyes of the viewer to first view image and second view image based on the viewer's position information.

The optimal viewing distance control device 100 then automatically calculates other view images between the primary view images using view numbers, which are separated at regular intervals, thereby producing a view map. Each time the viewer moves from side to side along an x-axis or moves forward or backward along a distance of a z-axis, the optimal viewing distance control device 100 updates the view map.

Further, with reference to FIGS. 2 and 3, the light path backtracking unit 102 senses in real time a viewer's position using an sensor mechanism such as an image sensor, an infrared sensor etc. (S1). The light path backtracking unit 102 converts a sensor signal into a digital signal using an analog-to-digital converter (ADC) and performs an eye tracking algorithm or a face tracking algorithm, thereby backtracking a path of light between subpixels of a display panel seen through a left eye and a right eye of the viewer. Hence, the light path backtracking unit 102 measures in real time a position of the subpixels of a pixel array the viewer sees (S2).

A change in a distance on the x-axis indicates a moving distance of the viewer when the viewer moves from side to side on the same plane as the screen of the display panel, and a change in a distance on the z-axis indicates a change in a distance between the screen of the display panel and the viewer. The primary view setting unit 104 then adjusts primary view images the viewer sees (S3).

In more detail, primary views are view images displayed on subpixels seen through both eyes of the viewer. The primary view setting unit 104 modifies a view difference between left and right eye images, the viewer sees through his or her left and right eyes when he or she moves, into a view difference capable of making the user normally feel a stereoscopic image.

Further, the view map adjustment unit 106 modifies other view images except the primary views modified by the primary view setting unit 104 in conformity with a previously determined multi-view image data format to produces a new view map (S4). The view map adjustment unit 106 supplies the view map to a 3D formatter 108, which then produces multi-view image data based on the view map input from the view map adjustment unit 106.

Figure 4:
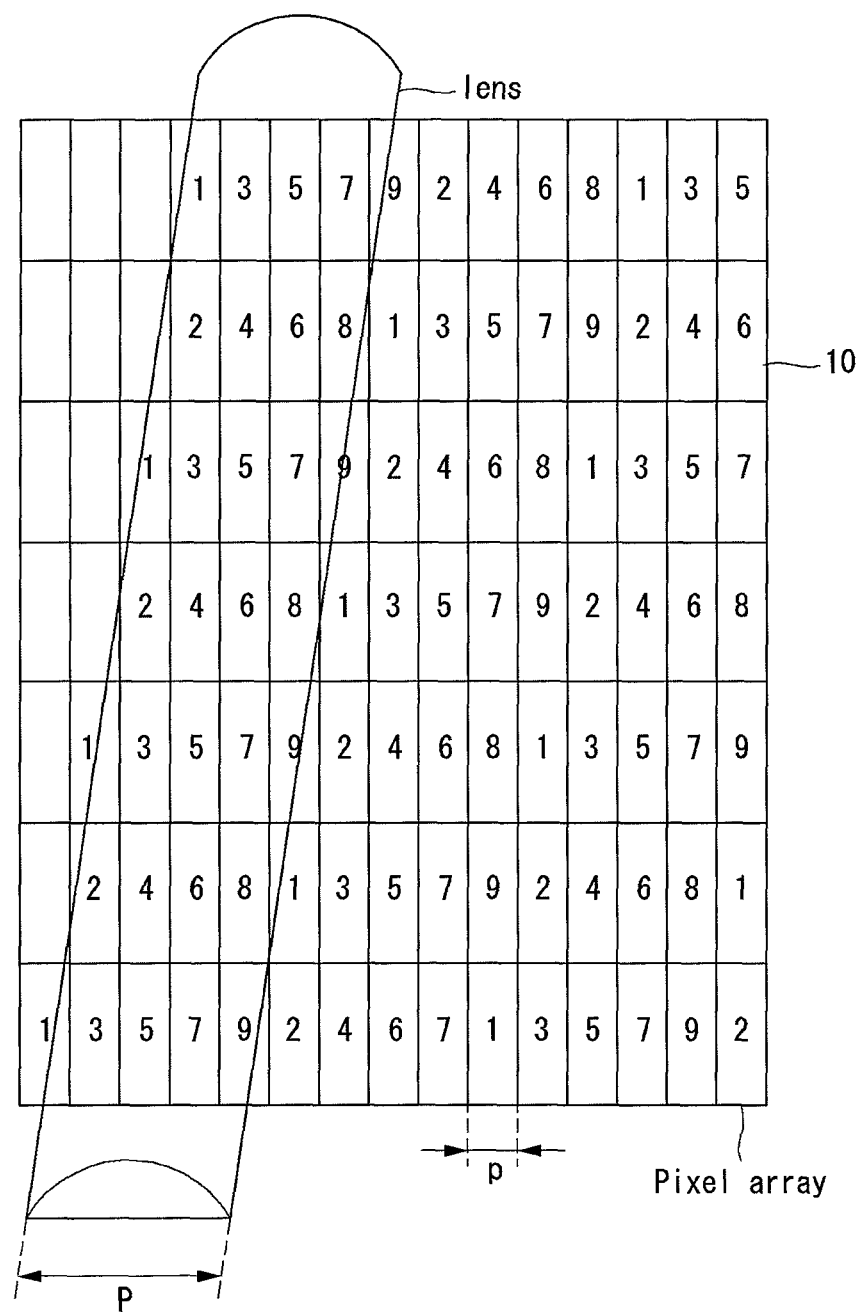
FIG. 4 illustrates a lens and multi-view images displayed on a pixel array.
Figure 5:
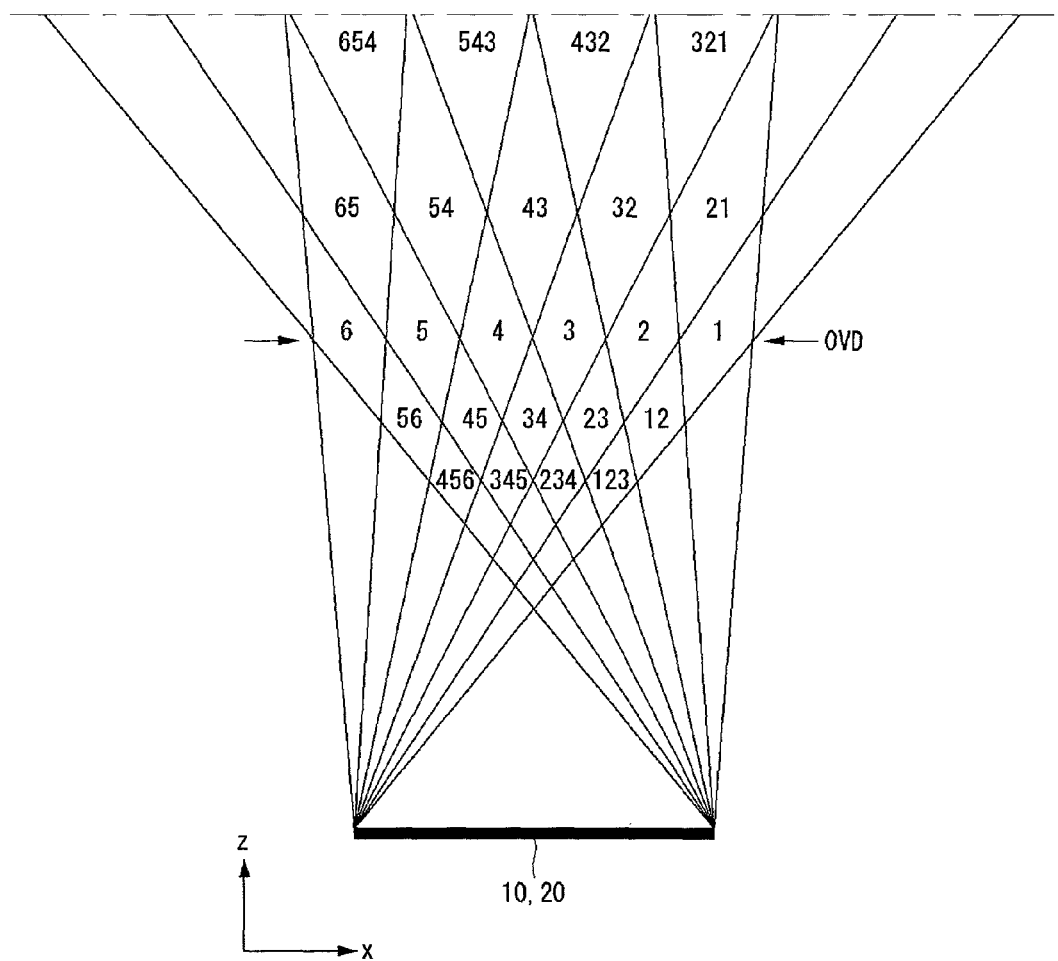
FIG. 5 illustrates examples of viewing zones and an optimal viewing distance.

Next, FIG. 4 shows a lens and multi-view images displayed on the pixel array, and FIG. 5 illustrates examples of viewing zones and an optimal viewing distance. As shown in FIGS. 4 and 5, multi-view image data mapped based on the view map is displayed on the pixel array of the display panel 10. In the example of FIG. 4, the multi-view image data is an example of 9-view image data, but is not limited thereto.

For example, the multi-view image data may be N-view image data, where N is a positive integer equal to or greater than 4. For 9-view images, a lens 20 is disposed on the pixel array, so that one pitch P of the lens 20 is disposed on 4.5-view images. The lens 20 separates an optical axis of each of the 4.5-view images using a refractive angle varying depending on a curved surface of the lens 20.

In FIG. 4, the number displayed on the subpixels of the pixel array indicates a number of a view image belonging to the multi-view images. For example, '1' indicates a first view image, '2' a second view image, '3' a third view image, and '4' a fourth view image. In FIG. 5, a diamond area means a viewing zone. A number written in the diamond area indicates a view image shown in the viewing zone.

In general, when the viewer positions at an optimal viewing distance OVD, one view image is recognized in one viewing zone. Therefore, the viewer can normally feel a stereoscopic image. For example, when the viewer positions at the optimal viewing distance OVD and positions in the middle of the screen of the display panel, the viewer sees only the third view image through his/her left eye and sees only the fourth view image through his/her right eye, thereby feeling binocular disparity.

However, in a viewing zone out of the optimal viewing distance OVD, several view images are displayed together in one viewing zone. For example, when the viewer is far from the display panel outside the optimal viewing distance OVD, he/she sees both the third and fourth view images through his/her left eye and sees both the fourth and fifth view images through his/her right eye as in viewing zones '43' and '54' of FIG. 5, thereby feeling 3D crosstalk. Hence, the viewer cannot normally feel the stereoscopic image and may feel dizzy and tired.

Thus, the method for controlling the optimal viewing distance according to the embodiment of the invention modifies the view map when the viewer moves along the x-axis or the z-axis, and thus makes the viewer normally feel the stereoscopic image even if the viewer moves at any position.

Figure 6:
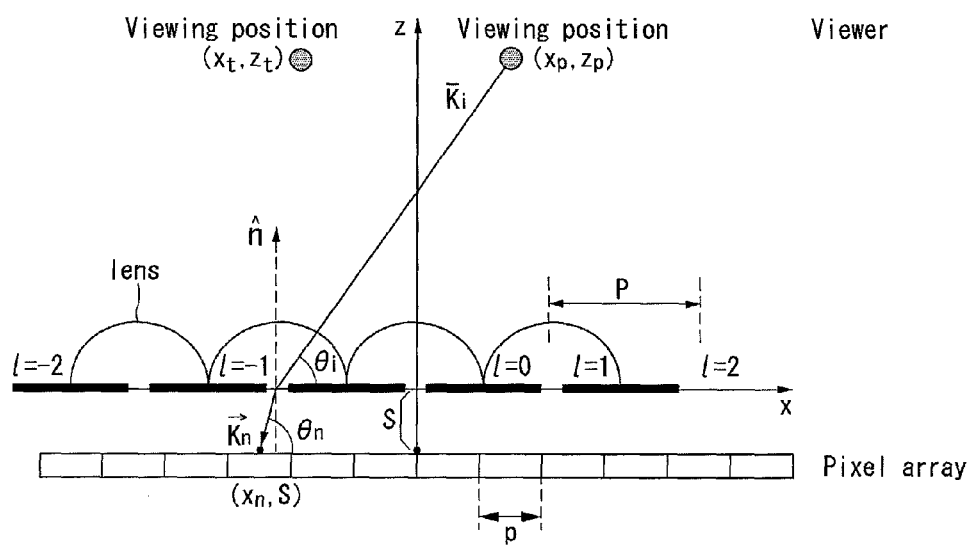
FIG. 6 illustrates the backtracking of a light path.

In more detail, the light path backtracking unit 102 receives x-axis and z-axis positions of the viewer sensed by the sensor mechanism and backtracks a path of light between the viewer's eye and the subpixel. That is, as shown in FIG. 6, the light path backtracking unit 102 calculates a refractive angle $\theta n$ between the viewer's eye and the display panel using Snell's law and calculates a position '$x_n$' of the subpixel seen from a viewer's position based on the refractive angle $\theta n$. The following Equation 1 indicates the refractive angle $\theta n$ calculated by Snell's law, and the following Equation 2 indicates the position '$x_n$' of the subpixel seen from a viewer's position ($x_p$, $y_p$). The light path backtracking unit 102 may use a known light path backtracking algorithm.

In FIG. 6, '$\theta i$' denotes an incident angle of the lens 20, and ($x_t$, $z_t$) and ($x_p$, $z_p$) denote positions of the viewer's eye, where $x_t$ and $x_p$ are positions of the viewer's eye on the x-axis, and $z_t$ and $z_p$ are positions of the viewer's eye on the z-axis. 'Ki' denotes a real distance between the viewer's eye and the center of the lens using ($X_p$, $Y_p$), and 'S' denotes a back length between the display panel and the lens. '$K_n$' denotes a real distance between a position of the subpixel the viewer sees and the center of the lens using ($X_n$, S). 'P' is a lens pitch, and 'p' is a pixel pitch. 'l' is a variable indicating a lens position based on the center of the pixel array of the display panel. The lens variable 'l' indicates that the lens position increases by one in a direction far from the center of the pixel array. Thus, signs of the lens variables 'l' on the left side and the right side of the center of the pixel array are different from each other.

$$\theta_n = 90° - \sin^{-1}\left(\frac{\sin(90° - \theta_i)}{1.5}\right) \qquad \text{(Equation 1)}$$

$$x_n = \frac{\tan\theta_n \cdot p \cdot l - S}{\tan\theta_n} \qquad \text{(Equation 2)}$$

The primary view setting unit 104 receives the position information '$x_n$' of the subpixel, the viewer sees through his/her eyes, calculated by the light path backtracking unit 102. Thus, when the viewer moves in the x-axis and the z-axis directions, the primary view setting unit 104 determines a location of subpixels seen by viewer on the pixel array in real time. Then, the primary view setting unit 104 adjusts primary view images seen through both eyes of the viewer on an original view map depending on changes in the viewer's position.

Figure 7:
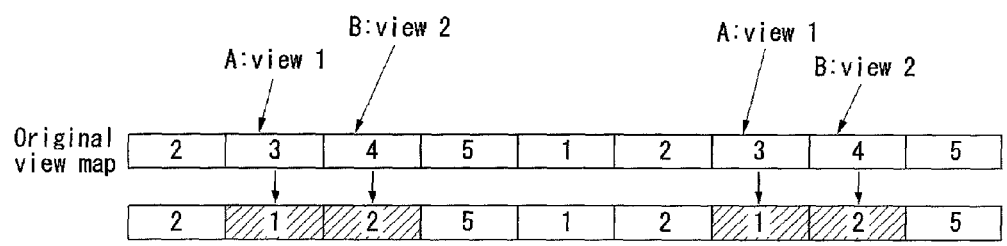
FIGS. 7 and 8 illustrate a method for adjusting primary view images.

For example, as shown in FIG. 7, the primary view setting unit 104 changes a view image displayed on the subpixels seen through one eye (the left eye or the right eye) of the viewer to an Ith view on the original view map and changes a view image displayed on the subpixels seen through the other eye (the right eye or the left eye) of the viewer to an (I+1)th view on the original view map. In FIG. 7, 'A:view 1' is a first primary view image seen through one eye 'A' of the viewer, and 'B:view 2' is a second primary view image seen through the other eye 'B' of the viewer.

Figure 8:
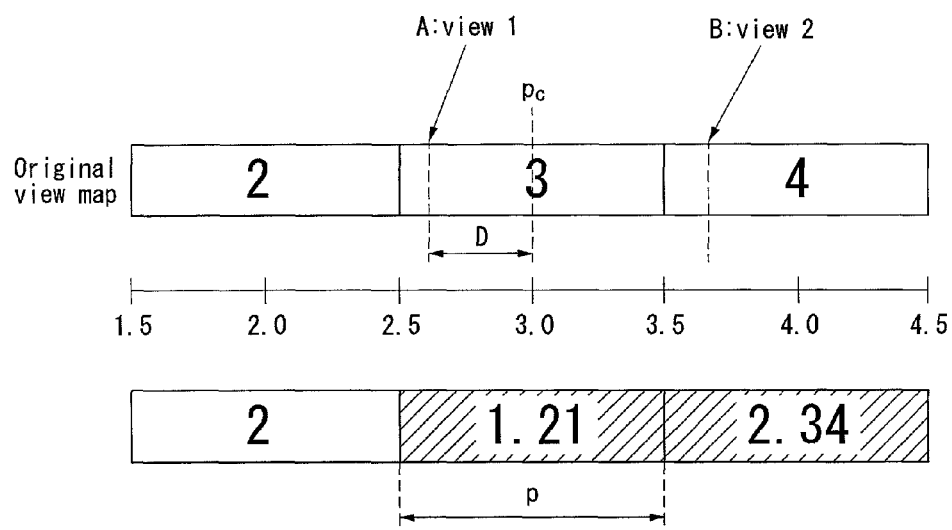

The primary view setting unit 104 can modify the primary view image into a view represented as a decimal through the following process, so as to more accurately calculate the view images to be displayed on the pixels the viewer sees (FIG. 8). The following method for modifying the primary view image into the view of the decimal is preferable when the primary view image cannot be sufficiently represented as an integer.

Further, the primary view setting unit 104 can accurately recognize a position of a subpixel, the viewer sees, as a decimal less than 1 based on the position information '$x_n$' of the $_{subpixel}$ received from the light path backtracking unit 102 and a previously determined pixel pitch. When a position of a subpixel the viewer sees is out of a center position of the subpixel, the primary view setting unit 104 can adjust a distance ranging from the center position of the subpixel to the position of the subpixel the viewer sees to primary view images represented by a decimal using the following Equations 3 and 4.

For example, as shown in FIG. 8, when $\theta_n=80°$, p (pixel pitch)=125 μm, l=100, and S=2940, the position information '$x_n$' of the subpixel in the above Equation 2 is '11981'. When a center position '$p_c$' of a 100th subpixel having l=100 is 11,944 μm, a position D ($=x_n-p_c$) out of the center position of the subpixel, calculated by Equation 3, is '37'. When a view number of a primary view image of the 100th subpixel, which has been already modified into an integer by the primary view setting unit 104, is view', a new view '$View_{new}$' obtained by substituting values calculated above for the following Equation 3 is 1.21 (=1+0.21). View image data of a decimal is calculated using values of pixel data having the view number represented as the integer through an interpolation method.

$$View_{new} = \frac{0.5 \times \text{pixel pitch} - D}{\text{pixel pitch}} + View' \quad \text{(Equation 3)}$$

$$D = x_n - p_c$$

Figure 9:
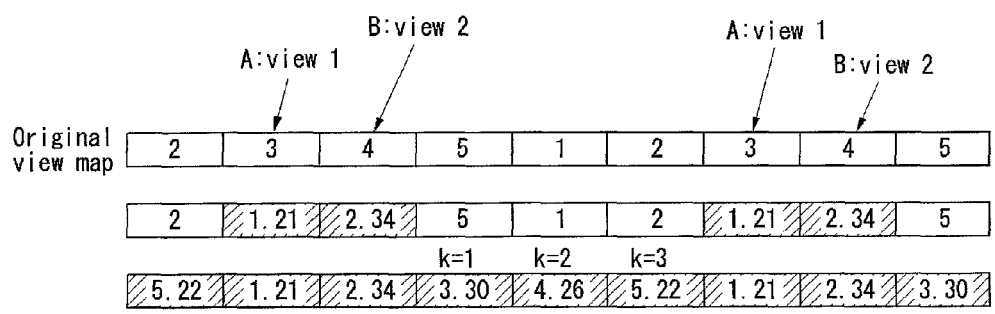
FIG. 9 illustrates a method for modifying view images other than primary view images.

As shown in FIG. 9, the view map adjustment unit 106 adjusts view images other than the primary view images adjusted by the primary view setting unit 104. Seeing only one view image through each of the left eye and the right eye of the viewer is ideal for the view map, but the viewer may partially see other view image adjacent to the one view image. Because of this, it is preferable that other view images adjacent to the primary view images as well as the primary view images are modified.

Namely, it is preferable that the other view images maintain a view difference defined by the previously determined original view map. The view map adjustment unit 106 adjusts other view images between the primary view images to a view difference defined by an original view image. For this, the view map adjustment unit 106 automatically calculates the other view images between the primary view images using view numbers, which are separated at regular intervals, using the following Equation 4. When the primary view images are adjusted to an integer, view images of FIG. 9 are determined as view images represented as an integer.

$$View_{new\_k} = View2 + \frac{k \times ((View1 + N) - View2)}{N - 1} \quad \text{(Equation 4)}$$

In the above Equation 4, 'k' is a variable indicating a kth view image among other view images between primary view images. 'N' is the number of views and is 5 in an example of FIG. 9. 'View1' is a view number of an Ith primary view image, and 'View2' is a view number of an (I+1)th primary view image.

In FIG. 9, three view images disposed between the primary view images have variables 'k' of 1, 2, and 3, respectively. Thus, according to Equation 4, the other view images except the primary view images are adjusted to $View_{new\_1}=2.34+0.96=3.30$, $View_{new\_2}=2.34+0.96*2=4.26$, and $View_{new\_3}=2.34+0.96*3=5.22$, respectively.

The 3D formatter 108 arranges data of multi-view images to be displayed on the pixel array of the display panel based on the view map received from the optimal viewing distance control device 100. When a view number of the view map is an integer, the 3D formatter 108 maps data of a view image corresponding to an ordinal number of the integer to a pixel position indicated by the view number of the view map.

In addition, when the view number defined by the view map includes a decimal, the 3D formatter 108 interpolates pixel data of a view image as indicated by the following Equation 5 and maps the interpolated pixel data to a pixel position indicated by the view number including the decimal. For example, when a decimal part of a view number is 0.4, the pixel data of the view image is calculated as (pixel data of a first view)×0.4+(pixel data of a second view)×0.6. Pixel data of a multi-view image data format output from the 3D formatter 108 is transmitted to a display panel driver.

$$R_{result} = R_1 \times 0.x + R_2 \times (1 - 0.x) \quad \text{(Equation 5)}$$

In the above Equation 5, '$R_{result}$' is interpolated pixel data, '$R_1$' is pixel data of the first view, '$R_2$' is pixel data of the second view, and 'x' in '0.x' is a positive integer of a decimal part.

Figure 11:
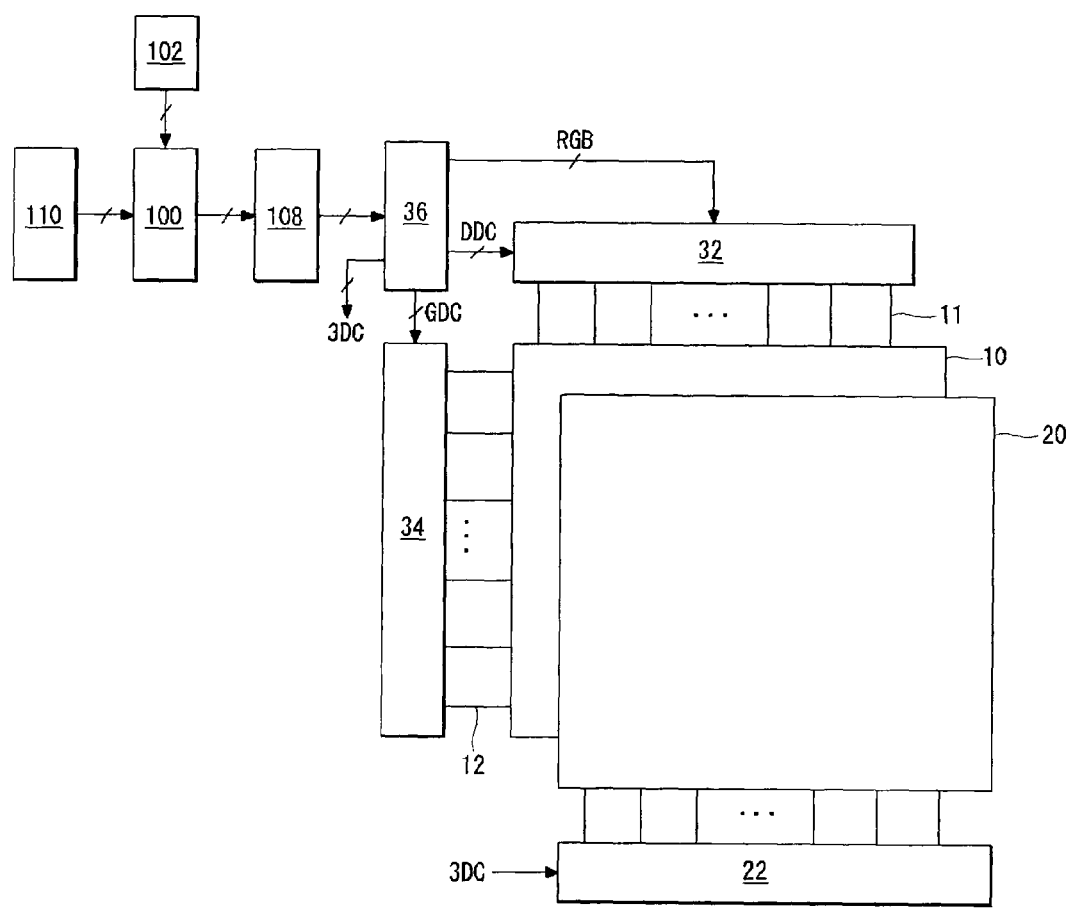
FIG. 11 shows a multi-view autostereoscopic display according to an embodiment of the invention.

FIG. 11 shows the multi-view autostereoscopic display according to the embodiment of the invention. As shown in FIG. 11, the multi-view autostereoscopic display according to the embodiment of the invention includes the display panel 10, the display panel driver, the lens 20, a lens driver 22, a sensor mechanism 32, and the optimal viewing distance control device 100.

Figure 10:
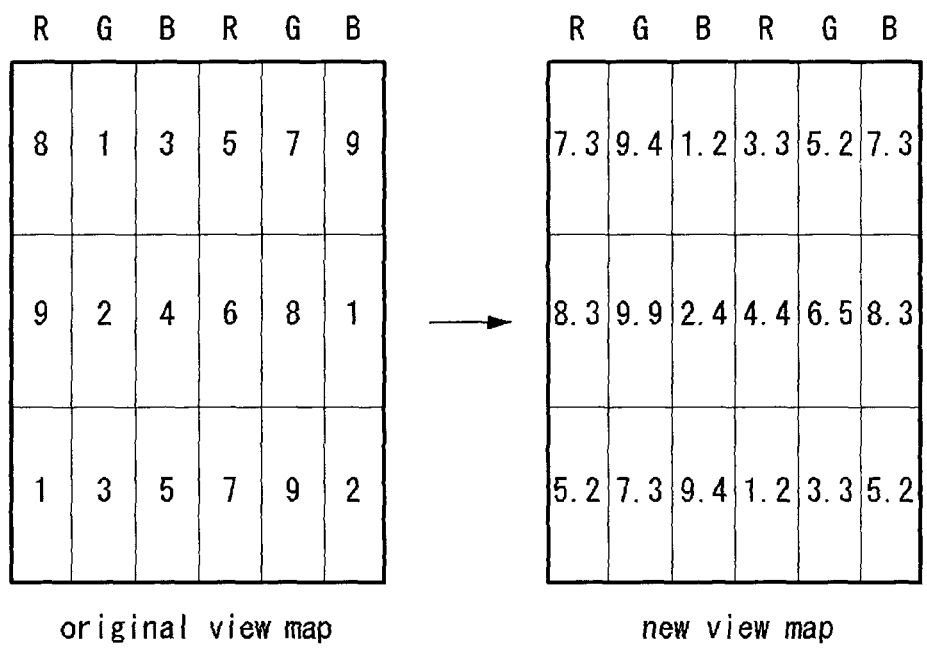
FIG. 10 illustrates an example of view map data output from a 3D formatter.

The display panel 10 includes the pixel array including pixels arranged in a matrix form based on a crossing structure of data lines 11 and gate lines (or scan lines) 12 orthogonal to the data lines 11. The multi-view images shown in FIG. 10 are displayed on the pixel array. Each of the pixels may include red, green, and blue subpixels. The pixel array displays a 2D image in a 2D mode and displays a left eye image and a right eye image in a 3D mode.

Further, the display panel driver writes pixel data of the multi-view image data format received from the optimal viewing distance control device 100 to the pixel array of the display panel 10. In the embodiment of the invention, the pixel data is digital data. The display panel driver includes a data driving circuit 32 for supplying data voltages of the 2D and 3D images to the data lines 11 of the display panel 10, a gate driving circuit 34 for sequentially supplying a gate pulse (or scan pulse) synchronized with the data voltage to the gate lines 12 of the display panel 10, and a timing controller 36 for controlling operation timings of the data driving circuit 32 and the gate driving circuit 34.

In addition, the data driving circuit 32 converts the pixel data received from the timing controller 36 into analog gamma voltages and generates the data voltages. The data driving circuit 32 then supplies the data voltages to the data lines 11 of the display panel 10. The gate driving circuit 34 supplies the gate pulse synchronized with the data voltage supplied to the data lines 11 to the gate lines 12 under the control of the timing controller 36 and sequentially shifts the gate pulse.

The timing controller 36 transmits the pixel data received from the optimal viewing distance control device 100 to the data driving circuit 32. The timing controller 36 receives timing signals, such as a vertical sync signal, a horizontal sync signal, a data enable signal, and a main clock, from a host system 110 in synchronization with digital video data RGB of the 2D and 3D input images.

In addition, the timing controller 36 generates timing control signals for controlling the operation timings of the data driving circuit 32 and the gate driving circuit 34 using the timing signals received from the host system 110. The timing control signals include a source timing control signal DDC for controlling the operation timing of the data driving circuit 32 and a gate timing control signal GDC for controlling the operation timing of the gate driving circuit 34. The timing control signals may further include a switchable lens control signal when the lens 20 is implemented as a switchable lens.

The timing controller 36 multiplies a frame rate of an input image by 'N' to obtain a frequency of (frame rate×N) Hz, where N is a positive integer equal to or greater than 2. Hence, the timing controller 36 may control an operation frequency of each of the driving circuits 32 and 34 and the lens driver 22 based on the frequency of (frame rate×N) Hz. The frame rate of the input image is 50 Hz in a phase alternate line (PAL) scheme and is 60 Hz in a national television standards committee (NTSC) scheme.

The optimal viewing distance control device 100 updates the view map through the above-described method when the viewer's position sensed by the sensor means 32 changes. The 3D formatter 108 maps the pixel data of the multi-view images received from the host system 110 based on the view map adjust by the optimal viewing distance control device 100 and transmits the mapped pixel data to the timing controller 36.

Figure 12:
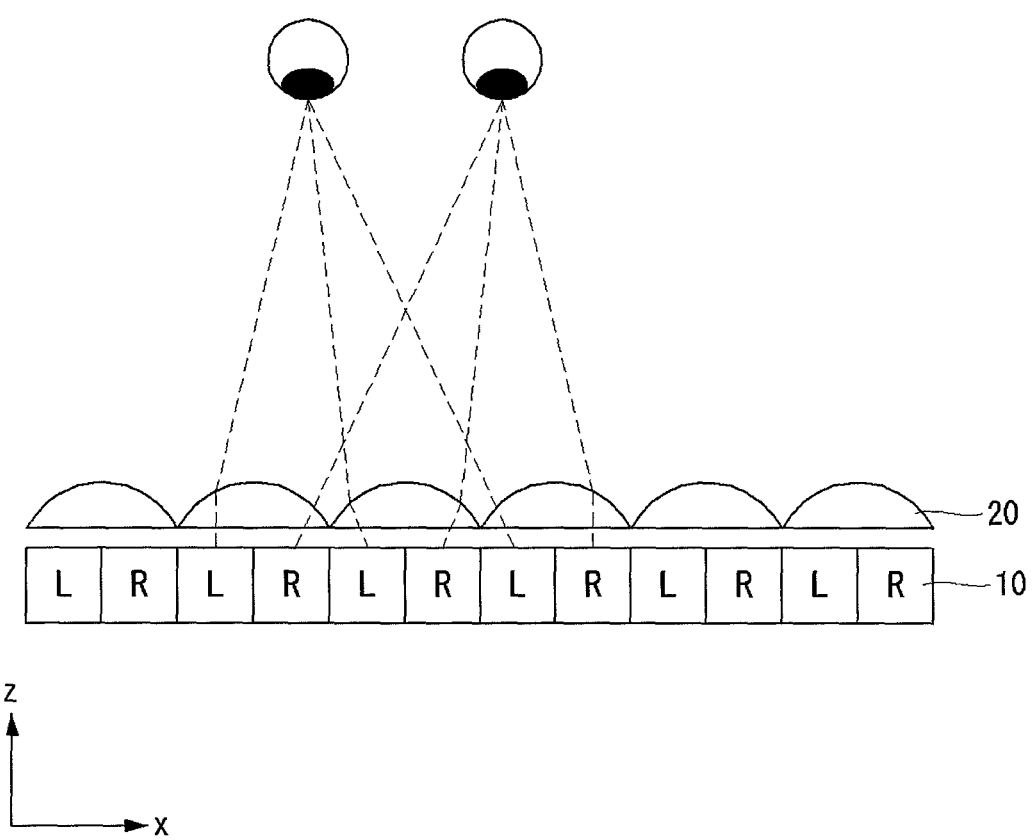
FIG. 12 is a cross-sectional view showing a lens of a multi-view autostereoscopic display according to an embodiment of the invention.

As shown in FIG. 12, the lens 20 is disposed on the display panel 10 and separates an optical axis of each of the multi-view images. The lens 20 includes birefringent media such as liquid crystals, electrodes, etc., and thus may be implemented as a switchable lens which is electrically driven by the lens driver 22 and separates optical axes of the view images. The switchable lens drives liquid crystal molecules depending on the voltage applied by the lens driver 22. Hence, the lens 20 may be implemented as a liquid crystal layer in synchronization with the pixel data written to the pixel array of the display panel 10 in the 3D mode, and the lens 20 may be removed in the 2D mode.

The lens driver 22 drives the switchable lens under the control of the timing controller 36. If the lens 20 is a film lens which is not electrically controlled, the lens driver 22 may be omitted.

Further, the host system 110 may be implemented as one of a TV system, a set-top box, a navigation system, a DVD player, a Blu-ray player, a personal computer (PC), a home theater system, and a phone system. The host system 110 converts the digital video data of the 2D and 3D input images into a format suitable for a resolution of the display panel 10 using a scaler and transmits the converted digital video data and the timing signals to the timing controller 36.

While the host system 110 transmits 2D image data to the timing controller 36 through the optimal viewing distance control device 100 and the 3D formatter 108 in the 2D mode, the host system 110 transmits multi-view image data to the optimal viewing distance control device 100 and the 3D formatter 108 in the 3D mode.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display comprising:
an optical element disposed on a pixel array of a display panel;
an optimal viewing distance control device configured to adjust primary view images seen through both eyes of a viewer to a first view image and second view image based on a viewer's position information sensed by a sensor, to automatically adjust other view images between the primary view images to view images separated at regular intervals, and to produce a view map using the adjusted primary view images and the adjusted other view images between the primary view images, wherein the primary view images are adjusted to primary view images represented by a decimal that is determined based on a position of a subpixel the viewer sees and a pixel pitch;
a 3D formatter configured to map pixel data of a multi-view image based on the view map received from the optimal viewing distance control device; and
a display panel driving circuit configured to write the pixel data of the multi-view image received from the 3D formatter to the display panel,
wherein the optimal viewing distance control device includes a light path backtracking unit configured to calculate a position of a subpixel the viewer sees, and
wherein the light path backtracking unit is further configured to calculate a refractive angle ($\theta_n$) and a position ($x_n$) of a subpixel the viewer sees using the following Equations:

$$\theta_n = 90° - \sin^{-1}\left(\frac{\sin(90° - \theta_i)}{1.5}\right)$$

$$x_n = \frac{\tan\theta_n \cdot p \cdot l - S}{\tan\theta_n}$$

where '$\theta i$' is an incident angle of the optical element, 'p' is a pixel pitch, 'l' is a variable indicating a position of the optical element based on the center of the pixel array of the display panel, and 'S' is a back length between the display panel and the optical element.

2. The display of claim 1, wherein the optimal viewing distance control device is further configured to update the view map each time the viewer moves from side to side along an x-axis on a same plane as a screen of the display panel or moves forward or backward along a distance of a z-axis between the screen of the display panel and the viewer.

3. The display of claim 2, wherein the optimal viewing distance control device includes:
a primary view setting unit configured to adjust the primary view images to be displayed at the position of the subpixel calculated by the light path backtracking unit to the first view image and the second view image; and
a view map adjustment unit configured to adjust the view images other than the primary view images to view numbers separated between the primary view images at regular intervals and to produce the view map.

4. The display of claim 3, wherein the primary view setting unit is further configured to calculate a distance (D) ranging from a center position of a subpixel to a position of the subpixel, out of the center position of the subpixel, to primary view images (View$_{new}$) represented by a decimal using the following Equation:

$$View_{new} = \frac{0.5 \times \text{pixel pitch} - D}{\text{pixel pitch}} + View'$$

$$D = x_n - p_c$$

where '$x_n$' is the position of the subpixel the viewer sees, '$p_c$' is the center position of the subpixel, and View' is a view number of the primary view image.

5. The display of claim 4, wherein the view map adjustment unit is further configured to separate other view images between the primary view images at regular intervals and to calculate the other view images using the following Equation:

$$View_{new\_k} = View2 + \frac{k \times ((View1 + N) - View2)}{N - 1}$$

where 'k' is a variable indicating a kth view image among the other view images between the primary view images, where k is a positive integer, 'N' is the number of views, 'View1' is a view number of the first primary view image, and 'View2' is a view number of the second primary view image.

6. The display of claim 5, wherein when a view number of the view map is an integer, the 3D formatter is further configured to map data of a view image corresponding to an ordinal number of the integer to a pixel position indicated by the view number of the view map, and
wherein when a view number defined by the view map includes a decimal, the 3D formatter is further configured to interpolate pixel data of a view image as indicated by the following Equation and to map the interpolated pixel data to a pixel position indicated by the view number including the decimal:

$$R_{result} = R_1 \times 0.x + R_2 \times (1 - 0.x)$$

where '$R_{result}$' is the interpolated pixel data, '$R_1$' is pixel data of a first view, '$R_2$' is pixel data of a second view, and 'x' in '0.x' is a decimal part of the view number.

7. A method of controlling a display, the method comprising:
an optical element disposed on a pixel array of a display panel;
adjusting, via an optimal viewing distance control device of the display, primary view images seen through both eyes of a viewer to a first view image and second view image based on a viewer's position information sensed by a sensor, wherein the adjusting adjusts the primary view images to primary view images represented by a decimal that is determined based on a position of a subpixel the viewer sees and a pixel pitch;
automatically adjust, via the optimal viewing distance control device, other view images between the primary view images to view images separated at regular intervals;
producing, via the optimal viewing distance control device, a view map using the adjusted primary view images and the adjusted other view images between the primary view images;
mapping, via a 3D formatter of the display, pixel data of a multi-view image based on the view map received from the optimal viewing distance control device; and
writing, via a display panel driving circuit of the display, the pixel data of the multi-view image received from the 3D formatter to the display panel,
wherein the optimal viewing distance control device includes a light path backtracking unit configured to calculate a position of a subpixel the viewer sees, and
wherein the light path backtracking unit is further configured to calculate a refractive angle ($\theta_n$) and a position ($x_n$) of a subpixel the viewer sees using the following Equations:

$$\theta_n = 90° - \sin^{-1}\left(\frac{\sin(90° - \theta_i)}{1.5}\right)$$

$$x_n = \frac{\tan\theta_n \cdot p \cdot l - S}{\tan\theta_n}$$

where '$\theta_i$' is an incident angle of the optical element, 'p' is a pixel pitch, 'l' is a variable indicating a position of the optical element based on the center of the pixel array of the display panel, and 'S' is a back length between the display panel and the optical element.

8. The method of claim 7, wherein the optimal viewing distance control device is further configured to update the view map each time the viewer moves from side to side along an x-axis on a same plane as a screen of the display panel or moves forward or backward along a distance of a z-axis between the screen of the display panel and the viewer.

9. The method of claim 8, wherein the optimal viewing distance control device includes:
a primary view setting unit configured to adjust the primary view images to be displayed at the position of the subpixel calculated by the light path backtracking unit to the first view image and the second view image; and
a view map adjustment unit configured to adjust the view images other than the primary view images to view numbers separated between the primary view images at regular intervals and to produce the view map.

10. The method of claim 9, wherein the primary view setting unit is further configured to calculate a distance (D) ranging from a center position of a subpixel to a position of the subpixel, out of the center position of the subpixel, to primary view images ($View_{new}$) represented by a decimal using the following Equation:

$$View_{new} = \frac{0.5 \times \text{pixel pitch} - D}{\text{pixel pitch}} + View'$$

$$D = x_n - p_c$$

where '$x_n$' is the position of the subpixel the viewer sees, '$p_c$' is the center position of the subpixel, and View' is a view number of the primary view image.

11. The method of claim 10, wherein the view map adjustment unit is further configured to separate other view images between the primary view images at regular intervals and to calculate the other view images using the following Equation:

$$View_{new\_k} = View2 + \frac{k \times ((View1 + N) - View2)}{N - 1}$$

where 'k' is a variable indicating a kth view image among the other view images between the primary view images, where k is a positive integer, 'N' is the number of views, 'View1' is a view number of the first primary view image, and 'View2' is a view number of the second primary view image.

12. The method of claim 11, wherein when a view number of the view map is an integer, the 3D formatter is further configured to map data of a view image corresponding to an ordinal number of the integer to a pixel position indicated by the view number of the view map, and wherein when a view number defined by the view map includes a decimal, the 3D formatter is further configured to interpolate pixel data of a view image as indicated by the following Equation and to map the interpolated pixel data to a pixel position indicated by the view number including the decimal:

$$R_{result} = R_1 \times 0.x + R_2 \times (1-0.x)$$

where '$R_{result}$' is the interpolated pixel data, '$R_1$' is pixel data of a first view, '$R_2$' is pixel data of a second view, and 'x' in '0.x' is a decimal part of the view number.

\* \* \* \* \*